Patented May 14, 1935

2,001,102

UNITED STATES PATENT OFFICE 2,001,102

METHOD FOR THE PRODUCTION OF ARALKYL ETHERS OF CELLULOSE

Eugene J. Lorand, Wilmington, Del., assignor to Hercules Powder Company, Wilmington, Del., a corporation of Delaware No Drawing. Application July 12, 1934, Serial No. 734,803

6 Claims. (Cl. 260—152)

This invention relates to a method for the production of aralkyl ethers of cellulose and more particularly for the production of benzyl cellulose.

Aralkyl ethers of cellulose, such as, for example, benzyl cellulose, the phenylethyl ether of cellulose, etc., are produced by the reaction of an aralkyl halide, such as benzyl chloride, phenylethyl chloride, etc., upon an intimate mixture of cellulose and an alkali solution, commonly referred to as alkali cellulose. Many procedures for conducting the reaction are known, but substantially all involve heating the mixture of alkali cellulose and aralkyl halide, usually at a temperature of about 60°–130° C. Sometimes all the alkali to be used is added at the start of the reaction, more often only a part is added initially and the remainder is added periodically during the reaction. When the reaction is conducted at a relatively high temperature, distillation of water and aralkyl halide (the latter being returned) from the reaction mass is often permitted.

The principal reaction involved is that between the aralkyl halide and the alkali cellulose leading to the production of an aralkyl ether of cellulose and an alkali halide. However, the aralkyl halide present is hydrolyzed and otherwise affected by the alkali solution present with the resultant formation of by-products, such as, for example, when a benzyl halide is used, benzyl alcohol, dibenzyl ether etc. The formation of such by-products is undesirable, since the side reactions leading to their production involve the wasteful use of both alkali and aralkyl halides. Since the aralkylation reaction is ordinarily carried out in the presence of a large excess of aralkyl halide, the amount of such by-products is rather large in comparison with the amount of cellulose ether formed.

When the reaction is completed, there accordingly remains, after the separation and removal of the cellulose ether, a mixture of excess aralkyl halide together with the various aralkyl alcohols and ethers formed by the side reactions. While the aralkyl halide may be recovered from this mixture and utilized again in the preparation of the cellulose ether, the by-products must either be disposed of as such or else converted into aralkyl halide for reuse in the reaction. It is not possible to dispose of these by-products economically as such, and their conversion back to the form of aralkyl halide is also expensive and uneconomical.

It is the purpose of this invention to provide a method for the formation of aralkyl ethers of cellulose which curtails, to a large degree, the undesirable side reactions and the consequent production of uneconomical by-products. The by-products which are least desirable, both because of the difficulty in disposing of them as such and the difficulty in converting them into aralkyl halide, are the aralkyl ethers such as, for example, dibenzyl ether. It has been found, in accordance with this invention, that if a portion of the aralkyl halide used in the reaction for the production of the cellulose ether is replaced by these aralkyl ethers, such as dibenzyl ether, the side reactions referred to above are substantially curtailed.

Since the aralkyl halide is used in the production of aralkyl ethers of cellulose both as a reagent and as a solvent, it is entirely feasible to replace a considerable portion of it with an aralkyl ether such as dibenzyl ether without substantially affecting the completeness of the cellulose etherification. It has been found, in accordance with this invention, that as much as 50% of the aralkyl halide usually required in the etherification reaction may be replaced by the corresponding aralkyl ether. In all other respects the reaction is conducted in the usual and well-known manner; the only effect of the aralkyl ether, for example, dibenzyl ether, being to substantially curtail the side reactions referred to above and to somewhat increase the length of time necessary for completion of the cellulose etherification. Also, since, through the curtailment of the side reactions, the alkali present is not wastefully consumed, less alkali needs to be added to the reaction mixture during the reaction than is the case in the usual etherification procedure.

Accordingly, the method in accordance with this invention will comprise any of the usual and well-known etherification procedures involving the reaction of alkali cellulose and an aralkyl halide with the use, instead of a substantially pure aralkyl halide, of a mixture of aralkyl halide and the corresponding aralkyl ether in amount within about the range 20–50% of the amount of halide. It is not necessary to use a pure, or even substantially pure, aralkyl ether to replace a portion of the aralkyl halide. For example, the crude mixture recovered from a previous cellulose etherification containing, for example, about 60% aralkyl halide, 30% aralkyl ether, 5–8% aralkyl alcohol, and 2–5% of by-products of high molecular weight and unknown composition may be advantageously used in the production of a cellulose ether in place of the substantially pure aralkyl halide usually used.

It is desirable, but in no way essential, to start the etherification of the alkali cellulose with the use of substantially pure aralkyl halide or an aralkyl halide containing only a small quantity of aralkyl ether. After the reaction is well under way, the volume of the reaction medium is increased by adding thereto more aralkyl halide containing a large proportion of aralkyl ether.

The following examples are illustrative of practical procedures in accordance with this invention:

*Example 1.*—24 grams of purified cotton linters are immersed in 300 cc. of 18% sodium hydroxide solution. After a few hours the alkali solution is pressed out of the linters until the impregnated mass weighs about 80–85 grams, of which about 13 grams will be sodium hydroxide. This alkali cellulose is placed in a suitable reaction vessel equipped for heating and for stirring, and 125 cc. of benzyl chloride are added thereto. The mixture is then heated until the benzyl chloride is slowly refluxing. This heating is continued for about an hour, during which period it is desirable, although not necessary, to impart gentle and slow agitation to the mass. At the end of the hour about 100 cc. of a crude dibenzyl ether (approximately 90% dibenzyl ether) and 3 grams of solid sodium hydroxide are added to the reaction mixture. The temperature is maintained at 110–115° C. and the agitation is increased until a vigorous stirring action is effected. More solid sodium hydroxide, in 3 gram portions, is intermittently added to the reaction mixture, at first at intervals of about 40 minutes and toward the end of the reaction at intervals of about one hour, until complete dispersion of the cellulose fibers is obtained. This indicates completion of the reaction and occurs in about eight hours.

The benzyl cellulose is recovered from the reaction mixture in the usual manner. An analysis of the reaction medium for sodium hydroxide after the completion of the reaction, in comparison with the known amount of sodium hydroxide added, shows that approximately 28 grams of sodium hydroxide have been consumed in the reaction. The amount of alkali consumed in the reaction is a direct measure of amount of side reactions that has occurred. The alkali consumption when benzyl cellulose is produced in a manner similar in all respects to that described above, with the single exception that pure benzyl chloride is used as the reaction medium, amounts to 38 grams.

*Example 2.*—25 grams of purified cotton linters are soaked with 350 grams of a 33% sodium hydroxide solution and, after a few hours, pressed out to a weight of about 110–115 grams, of which about 36 grams represent sodium hydroxide. The alkali cellulose so produced is placed in a reaction vessel equipped for distillation and for agitation, for example, with a mechanical stirrer. 200 cc. of the crude mixture recovered from a previous benzylation and containing about 60% benzyl chloride and 30% dibenzyl ether are added to the alkali cellulose, and the mixture is heated to a temperature at which distillation starts while being slowly stirred. In about two hours about 21 cc. of benzyl chloride and 38 cc. of water have distilled over from the reaction mixture. The speed of agitation is then gradually increased and 100 cc. more of the crude mixture referred to above are added. After distillation has continued for two hours more, about 10 cc. more of benzyl chloride and about 18 cc. more of water have been distilled over. 30 cc. of a 25% sodium hydroxide solution are then added and the distillation is continued for two more hours. The benzylation is then complete and the benzyl cellulose may be recovered in the usual manner.

The alkali consumption in the reaction is about 29 grams of sodium hydroxide as compared with an alkali consumption of 36 grams of sodium hydroxide when pure benzyl chloride is used as the reaction medium.

What I claim and desire to protect by Letters Patent is:

1. The method for the production of an aralkyl ether of cellulose which includes treating alkali cellulose with a mixture of an aralkyl halide and the corresponding diaralkyl ether to effect reaction between the alkali cellulose and the aralkyl halide, whereby the hydrolysis of the aralkyl halide is reduced.

2. The method for the production of an aralkyl ether of cellulose which includes treating alkali cellulose with a mixture comprising an aralkyl halide and from about 20% to about 50% of the corresponding diaralkyl ether to effect reaction between the alkali cellulose and the aralkyl halide, whereby the hydrolysis of the aralkyl halide is reduced.

3. The method for the production of benzyl cellulose which includes treating alkali cellulose with a mixture of benzyl chloride and dibenzyl ether to effect reaction between the alkali cellulose and the benzyl chloride, whereby the hydrolysis of the benzyl chloride is reduced.

4. The method for the production of benzyl cellulose which includes treating alkali cellulose with a mixture comprising benzyl chloride and from about 20% to about 50% of dibenzyl ether to effect reaction between the alkali cellulose and the benzyl chloride, whereby the hydrolysis of the benzyl chloride is reduced.

5. The method for the production of benzyl cellulose which includes treating alkali cellulose with a mixture including about 60% aralkyl halide, about 30% corresponding diaralkyl ether and 5–8% corresponding aralkyl alcohol to effect reaction between the alkali cellulose and the aralkyl halide, whereby the hydrolysis of the aralkyl halide is reduced.

6. The method for the production of benzyl cellulose which includes treating alkali cellulose with a mixture including about 60% benzyl chloride and about 30% dibenzyl ether to effect reaction.

EUGENE J. LORAND.